(12) United States Patent
Uefune et al.

(10) Patent No.: US 11,295,769 B2
(45) Date of Patent: Apr. 5, 2022

(54) SOFT MOUNT VOICE COIL MOTOR ASSEMBLY

(71) Applicant: Western Digital Technologies, Inc., San Jose, CA (US)

(72) Inventors: Kouki Uefune, Kanagawa (JP); Takako Hayakawa, Kanagawa (JP); Toshio Takahashi, Tokyo (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/915,698

(22) Filed: Jun. 29, 2020

(65) Prior Publication Data

US 2021/0407536 A1 Dec. 30, 2021

(51) Int. Cl.
| | |
|---|---|
| *G11B 5/55* | (2006.01) |
| *H02K 41/035* | (2006.01) |
| *G11B 5/48* | (2006.01) |
| *G11B 5/56* | (2006.01) |
| *G11B 5/54* | (2006.01) |

(52) U.S. Cl.
CPC .......... *G11B 5/4813* (2013.01); *G11B 5/4893* (2013.01); *G11B 5/54* (2013.01); *G11B 5/5504* (2013.01); *G11B 5/56* (2013.01); *H02K 41/0354* (2013.01); *H02K 41/0356* (2013.01)

(58) Field of Classification Search
None
See application file for complete search history.

(56) References Cited

U.S. PATENT DOCUMENTS

| | | | | |
|---|---|---|---|---|
| 5,191,492 | A | * | 3/1993 | Nayak ................. G11B 5/5504 360/77.12 |
| 5,262,913 | A | * | 11/1993 | Stram ................... G11B 21/12 360/265.1 |
| 5,726,834 | A | | 3/1998 | Eckberg et al. |
| 5,739,984 | A | | 4/1998 | Eckberg |
| 5,793,573 | A | | 8/1998 | Eckberg et al. |

(Continued)

FOREIGN PATENT DOCUMENTS

| | | |
|---|---|---|
| JP | 2002223554 A | 8/2002 |
| JP | 2003059020 A | 2/2003 |
| JP | 2006012223 A | 1/2006 |

OTHER PUBLICATIONS

Eleftheriou, Evangelos et al.; Control Technologies for Emerging Micro and Nanoscale Systems, Springer; 10.1007/978-3-642-22173-6., 2011 (300 page).

(Continued)

*Primary Examiner* — Jefferson A Evans
(74) *Attorney, Agent, or Firm* — Patterson & Sheridan, LLP; Steven H. Versteeg (57) ABSTRACT

The present disclosure generally relates to a voice coil motor (VCM) yoke assembly mounted to an actuator block for a data storage device. One or more fastening mechanisms couple the VCM assembly to the actuator block. The fastening mechanisms are coupled to the VCM assembly by one or more soft mounts. The one or more soft mounts reduce undesirable movement of the magnetic recording head by spacing the VCM assembly from the actuator block, yet still ensuring the VCM assembly is properly coupled to the actuator block.

19 Claims, 9 Drawing Sheets

(56) References Cited

U.S. PATENT DOCUMENTS

| | | | |
|---|---|---|---|
| 5,914,836 A * | 6/1999 | Pottebaum | H02K 41/0358 360/264.8 |
| 6,608,732 B2 * | 8/2003 | Bernett | H02K 41/0354 360/264.7 |
| 6,624,974 B2 * | 9/2003 | Haupt | G11B 15/60 360/130.21 |
| 7,227,724 B2 | 6/2007 | Nayak et al. | |
| 7,679,864 B2 | 3/2010 | Nayak et al. | |
| 7,944,649 B2 * | 5/2011 | Yeakley | G11B 5/584 360/261.1 |
| 8,054,577 B2 * | 11/2011 | Eaton | G11B 15/602 360/83 |
| 2002/0080531 A1 | 6/2002 | Inoguchi et al. | |
| 2003/0206378 A1 * | 11/2003 | Ooi | G11B 5/4806 360/265.1 |
| 2004/0184195 A1 * | 9/2004 | Nayak | G11B 5/5504 360/261.1 |
| 2007/0025014 A1 * | 2/2007 | Kim | G11B 33/08 360/97.19 |
| 2007/0053110 A1 | 3/2007 | Harper | |
| 2007/0285845 A1 | 12/2007 | Nayak et al. | |
| 2010/0134927 A1 * | 6/2010 | Minami | G11B 5/54 360/265.1 |
| 2011/0255195 A1 * | 10/2011 | Poorman | G11B 5/584 360/241 |
| 2012/0008221 A1 * | 1/2012 | Min | H02K 41/0354 359/824 |
| 2012/0075741 A1 * | 3/2012 | Ho | G11B 5/4846 360/75 |
| 2012/0162826 A1 * | 6/2012 | Sudo | H02K 41/0358 360/266.5 |
| 2012/0206824 A1 * | 8/2012 | Park | G02B 7/08 359/824 |
| 2016/0302560 A1 * | 10/2016 | Takata | H02K 33/18 |
| 2020/0136488 A1 * | 4/2020 | Takahashi | H02K 33/00 |
| 2020/0217386 A1 * | 7/2020 | Kordunsky | F16F 7/104 |
| 2021/0409604 A1 * | 12/2021 | Sharma | H02K 41/0354 |

OTHER PUBLICATIONS

Related U.S. Appl. No. 16/365,034, filed Mar. 26, 2019.

* cited by examiner

SOFT MOUNT VOICE COIL MOTOR ASSEMBLY

BACKGROUND OF THE DISCLOSURE

Field of the Disclosure

Embodiments of the present disclosure generally relate to a voice coil motor (VCM) yoke assembly for a data storage device.

Description of the Related Art

There are numerous types of data storage devices including hard disk drives (HDD), solid state drives (SSD), and tape drives to name just a few. Tape drives are tape data storage systems for storing digital information on magnetic tape using digital recording. Tape drives are more commonly packaged in cartridges and cassettes. A tape drive performs writing or reading of data in the cartridges or cassettes. A common cassette-based format is LTO, which comes in a variety of densities.

Tape drives operate by using a tape head to record and read back information from tapes by magnetic processes. The tape head comprises servo elements and data elements that are arranged in an array that is oftentimes referred to as a tape head array.

Both tape drives and HDDs utilize VCMs. VCMs are the simplest type of electric motors and typically comprise two parts, a magnetic housing and a coil. Applying a voltage across the terminals of the VCM causes the motor to move. As industry seeks to improve data storage density in both HDDs and tape drives without increasing the footprint of the HDD or tape drive, simply shrinking the components of the HDD or tape drive while increasing the size of the storage media simply will not work without some creative engineering solutions. Additionally, the VCM is mounted to an actuator block which can cause undesirable movement of the magnetic recording head.

Therefore, there is a need in the art for an improved VCM yoke assembly for data storage devices to accommodate changing space allocations and to reduce undesirable movement of the magnetic recording head.

SUMMARY OF THE DISCLOSURE

The present disclosure generally relates to a voice coil motor (VCM) yoke assembly mounted to an actuator block for a data storage device. One or more fastening mechanisms couple the VCM assembly to the actuator block. The fastening mechanisms are coupled to the VCM assembly by one or more soft mounts. The one or more soft mounts reduce undesirable movement of the magnetic recording head by spacing the VCM assembly from the actuator block, yet still ensuring the VCM assembly is properly coupled to the actuator block.

In one embodiment, a voice coil motor (VCM) yoke assembly comprises: a VCM body having one or more openings formed therethrough; a spacer element extending through at least one opening of the one or more openings, wherein the spacer element comprises a first portion extending from a first side of the VCM body, a second portion extending through the at least one opening of the one or more openings, and a third portion extending from a second side of the VCM body, wherein the second side of the VCM body is opposite the first side of the VCM body, wherein the first portion has a first inner diameter and a first outer diameter, the second portion has a second inner diameter and a second outer diameter, and the third portion has a third inner diameter and a third outer diameter, wherein the first inner diameter and the second inner diameter are substantially identical, and wherein the first outer diameter and the second outer diameter are different; and a plurality of magnets coupled to the VCM body.

In another embodiment, a voice coil motor (VCM) yoke assembly comprises: a VCM body having one or more openings formed therethrough; a spacer element extending through at least one opening of the one or more openings, wherein the spacer element has a rotational hardness defined by: $Fr=(1/(2\pi))*SQRT((2Kr^2)/J_{VCM})$ where Fr is the rotational hardness, K is spring constant of the spacer element, r is an internal radius of the spacer element, $J_{VCM}$ is inertia of the VCM assembly, and SQRT is square root, wherein the rotational hardness is between about 46.7 Hz and about 93.3 Hz; and a plurality of magnets coupled to the VCM body.

In another embodiment, a voice coil motor (VCM) yoke assembly comprises: a VCM body having one or more openings formed therethrough; a spacer element extending through at least one opening of the one or more openings, wherein the spacer element has a parallel hardness defined by: $Fp=(1/(2\pi))*SQRT((2K)/M_{VCM})$ where Fp is the parallel hardness, K is spring constant of the spacer element, $M_{VCM}$ is mass of the VCM assembly, SQRT is square root, wherein the parallel hardness is between about 200 Hz and about 400 Hz; and a plurality of magnets coupled to the VCM body.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a voice coil motor (VCM) yoke assembly mounted to an actuator block for a data storage device. One or more fastening mechanisms couple the VCM assembly to the actuator block. The fastening mechanisms are coupled to the VCM assembly by one or more soft mounts. The one or more soft mounts reduce undesirable movement of the magnetic recording head by spacing the VCM assembly from the actuator block, yet still ensuring the VCM assembly is properly coupled to the actuator block.

Figure 1A:
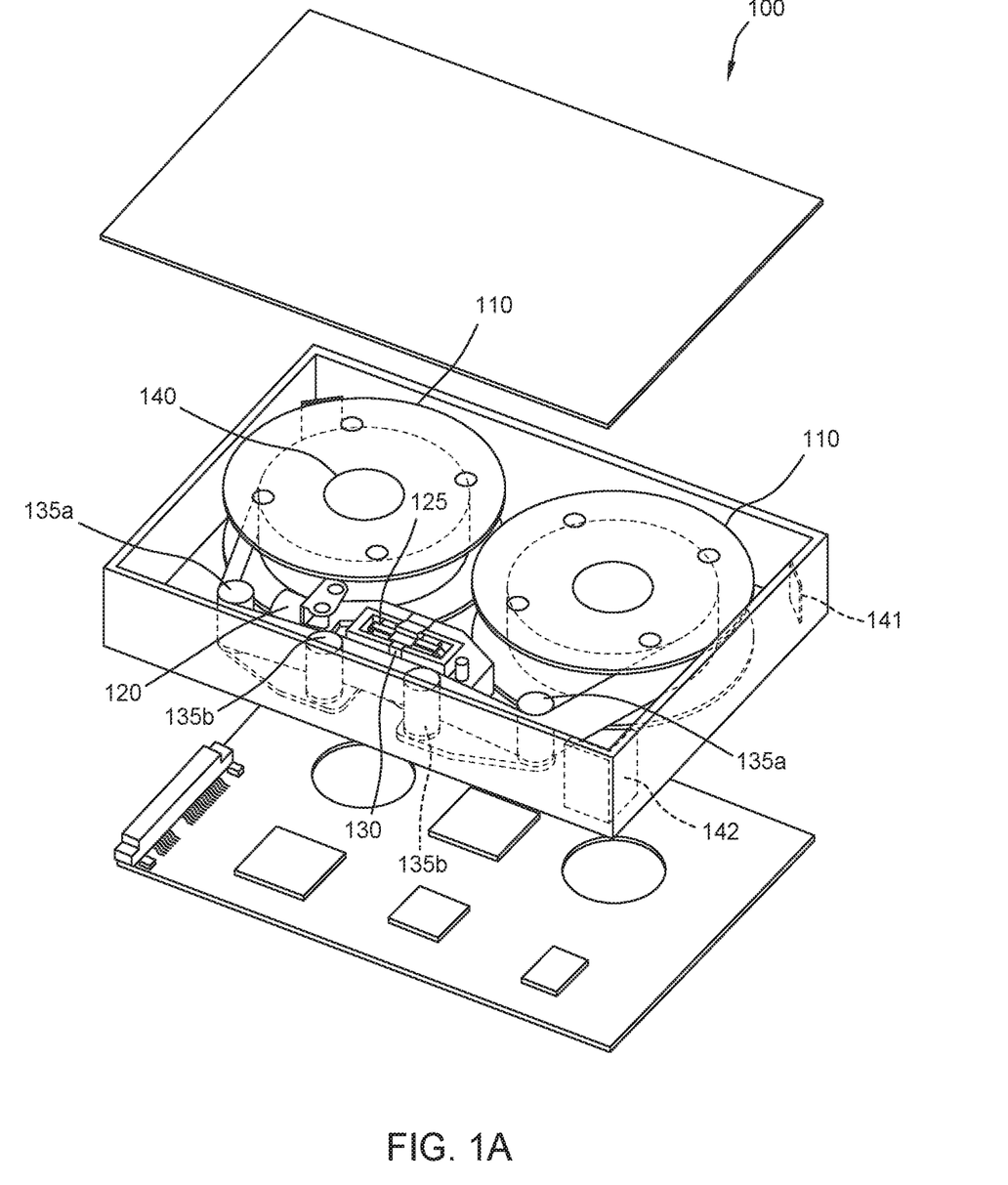
FIGS. 1A-1C illustrate a perspective exploded view and a simplified top down and side profile view of a tape embedded drive, in accordance with some embodiments.
Figure 1B:
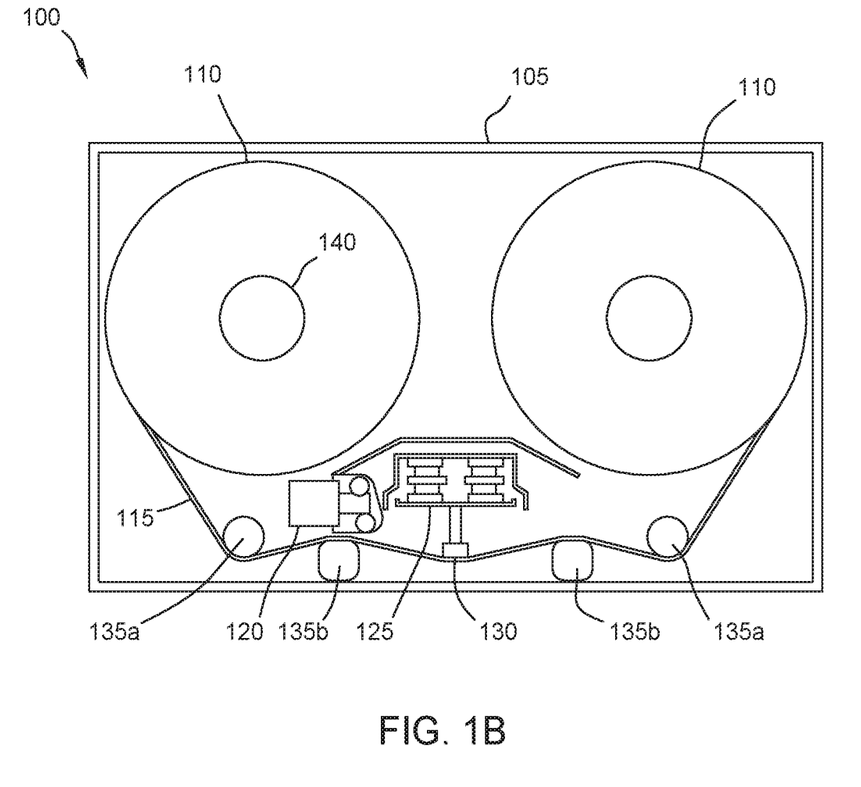
Figure 1C:
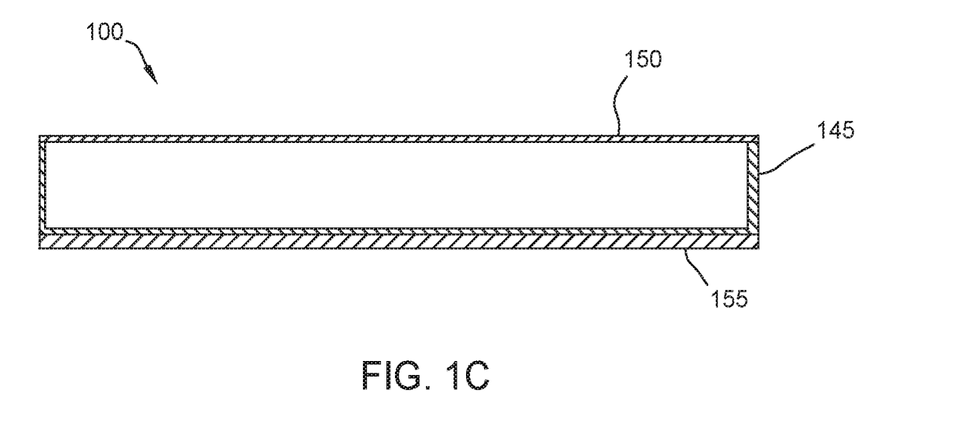

FIGS. 1A-1C illustrate a perspective exploded view and a simplified top down and side profile view of a tape embedded drive, in accordance with some embodiments. Focusing on FIG. 1B, for example, the tape embedded drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. Focusing on FIG. 1C, for example, the tape embedded drive further comprises a printed circuit board assembly (PCBA). In an embodiment, most of the components are within an interior cavity of the casing, except the PCBA, which is mounted on an external surface of the casing. The same components are illustrated in a perspective view in FIG. 1A.

In the illustrated embodiments, two tape reels 110 are placed in the interior cavity of the casing, with the center of the two tape reels on the same level in the cavity and with the head assembly 130 located in the middle and below the two tape reels. Tape reel motors located in the spindles of the tape reels can operate to wind and unwind the tape media 115 in the tape reels. Each tape reel may also incorporate a tape folder to help the tape media 115 be neatly wound onto the reel. The tape media may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels are biased against the guides/rollers 135a, 135b (collectively referred to as guides/rollers 135) and are movably passed along the head assembly 130 by movement of the reels. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two functional rollers may be cylindrical in shape, while the two functional guides may be flat-sided (e.g., rectangular prism) or clip shaped with two prongs and the film moving between the prongs of the clip.

The voice coil motor and stepping motor may variably position the tape head(s) transversely with respect to the width of the recording tape. The stepping motor may provide coarse movement, while the voice coil motor may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape embedded drive 100 within the casing. In particular, as the head mechanism is internal to the casing in certain embodiments, the tape media 115 may not be exposed to the outside of the casing, such as in conventional tape drives. Thus, the tape media 115 does not need to be routed along the edge of the casing and can be freely routed in more compact and/or otherwise more efficient ways within the casing. Similarly, the head(s) and tape reels may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA is made of solid state electronics, environmental issues are less of a concern, so it does not need to be placed inside the casing 105. That leaves room inside casing for other components, particularly, the moving components and the tape media 115 that would benefit from a more protected environment.

In some embodiments, the tape embedded drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing.

In one embodiment, the cover 150 is used to hermetically seal the tape embedded drive. For example, the drive 100 may be hermetically sealed for environmental control by attaching (e.g., laser welding, adhesive, etc.) the cover to the base 145. The drive 100 may be filled by helium, nitrogen, hydrogen, or any other typically inert gas.

In some embodiments, other components may be added to the tape embedded drive 100. For example, a pre-amp for the heads may be added to the tape embedded drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

Figure 2:
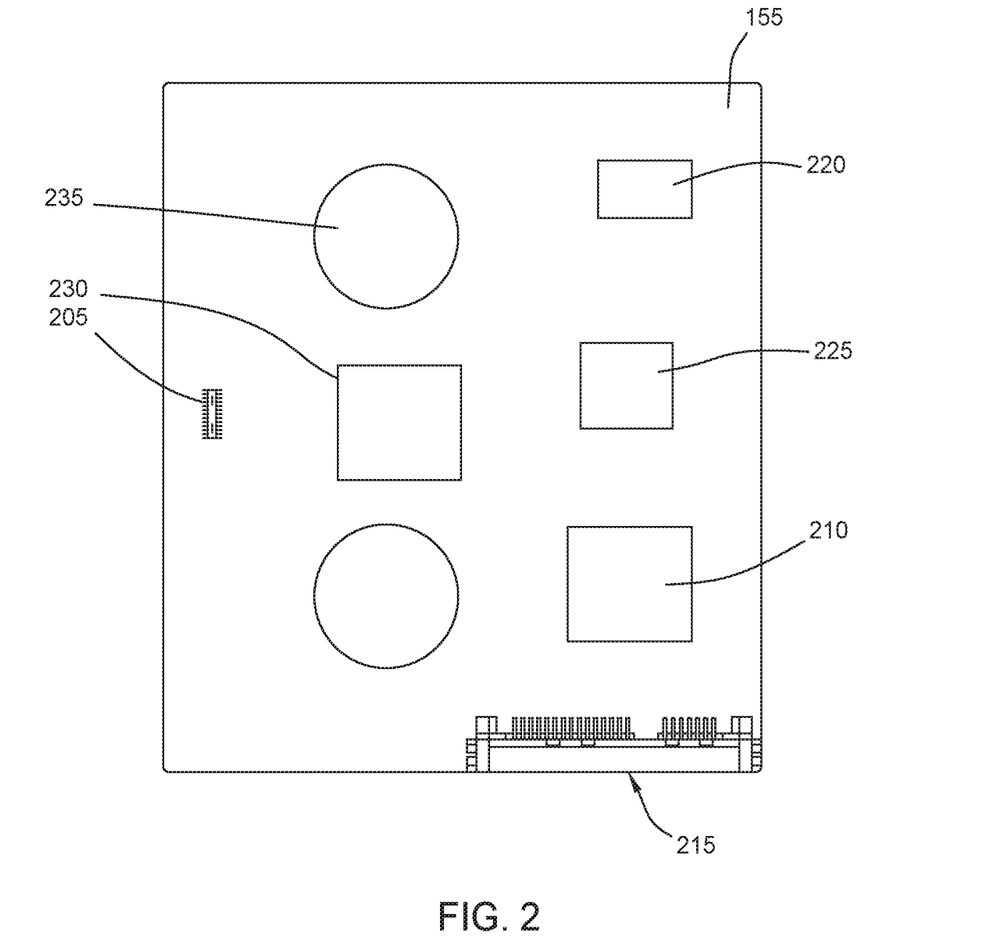
FIG. 2 illustrates a top perspective view of a printed circuit board assembly (PCBA) of the tape embedded drive, in accordance with some embodiments.

FIG. 2 illustrates a top perspective view of a printed circuit board assembly (PCBA) 155 of the tape embedded drive 100, in accordance with some embodiments. The PCBA 155 of the tape embedded drive may be the PCBA 155 of FIG. 1. The PCBA 155 is attached to the bottom surface of the casing, with a connector 205 attaching to contacts or an interface on the bottom surface electrically/electronically connected to internal components in the casing. For example, the contacts or interface may be electrically connected to one or more motors and/or actuators within the casing. In one embodiment, the contacts/interface are built into the casing without comprising an air tight seal of the casing. In some embodiments, the connector 205 may be an electrical feed-through electrically connecting components inside the casing to those on the PCBA, while maintaining sealing of the casing.

The PCBA 155 can include various components, such as one or more controllers, one or more connectors 205, a system on a chip (SoC) 210, one or more data interfaces 215 (e.g., Serial ATA (SATA), Serial Attached SCSI (SAS), non-volatile memory express (NVMe), or the like), a memory 220, a Power Large Scale Integration (PLSI) 225, and/or data read channel controller 230. One or more cutouts 235 can be added in the PCBA 155 to provide additional space for tape reel motors, if needed. For example, the portion of the casing above the tape reel motors may be raised to provide additional space for the motors. By providing cutouts 235, the thickness of the tape embedded drive 100 may be reduced as the PCBA 155 may surround the raised portion of the casing.

The PCBA 155 may extend along the entire bottom exterior surface of the casing 105 or may only partially extend along the surface, depending on how much space the various components need. In some embodiments, a second PCBA 155 may be located internally in the casing 105 and be in communication with the first PCBA 155, for example, via the connector 205.

In some embodiments, a controller on the PCBA 155 controls the read and write operations of the tape embedded drive 100. The controller may engage the tape spool motors and cause the tape spools to wind the tape film forwards or backwards. The controller may use the stepping motor and the voice coil motor to control placement of the head(s) over the tape film. The controller may also control output/input of data to or from the tape embedded drive 100 through the one or more interfaces 215, such as SATA or SAS.

Figure 3:
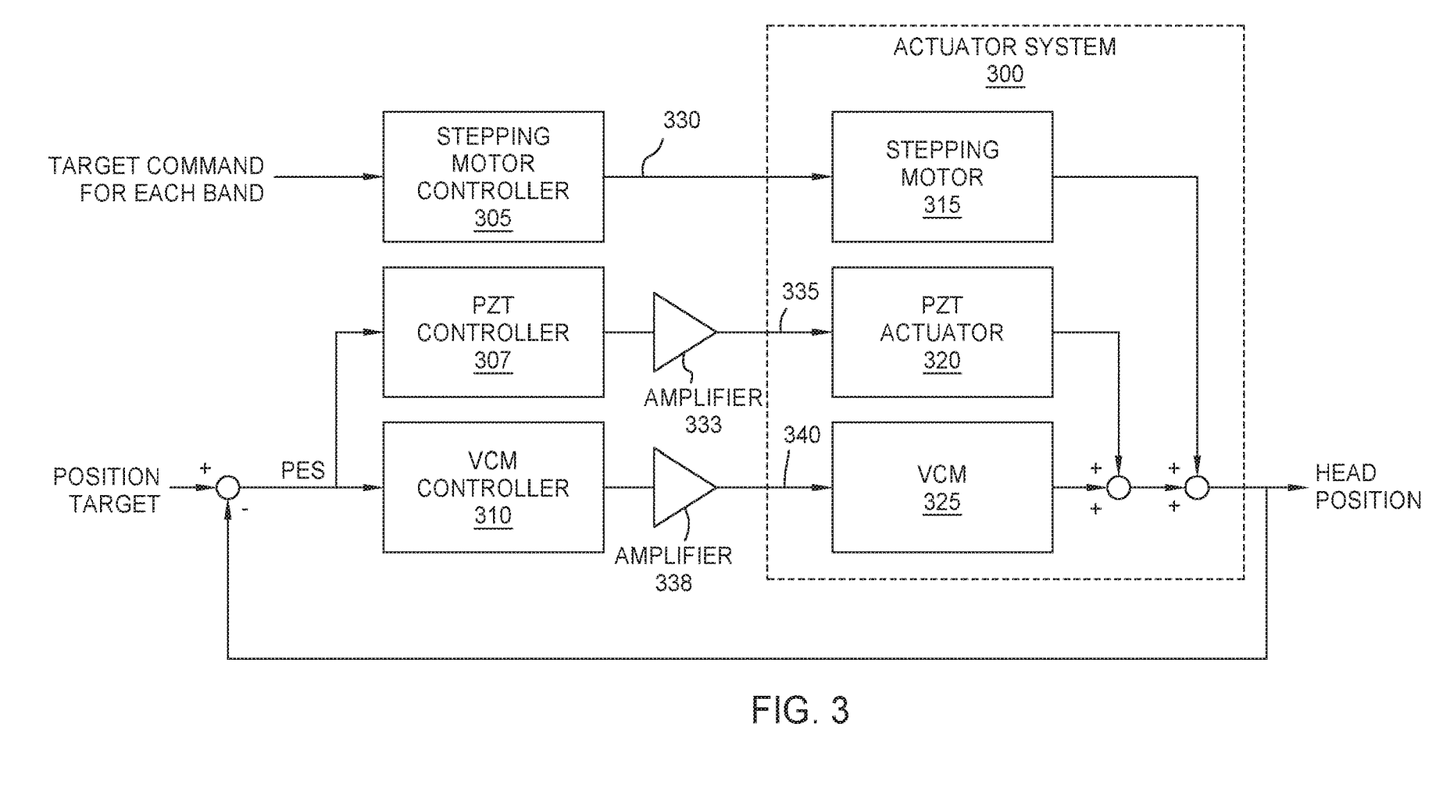
FIG. 3 illustrates a control block diagram for a servo-mechanical system of the tape embedded drive, in accordance with some embodiments.

FIG. 3 illustrates a control block diagram for a servo-mechanical system 300 of the tape embedded drive 100, in accordance with some embodiments. The control logic for the system may be implemented as a process in one or more controllers of the tape embedded drive 100, such as the SoC and/or PLSI in the PCBA and used to control one or more motors and/or one or more actuators.

In an embodiment, a stepping motor controller 305, a PZT controller 307, and a VCM controller 310 work together to control a stepping motor 315, a PZT actuator 320, and a VCM 325 to coordinate the movement of the head(s) in response to a target command.

As discussed above, the stepping motor 315 may provide coarse movement, the VCM 325 may provide fine movement, and the PZT actuator 320 may provide very fine movement. For example, assuming a 12.65 mm tape width, the stepping motor stroke may be about 12.65 mm, with the VCM stroke at about 4 mm, and the PZT stroke at about 4 µm. In this embodiment, the various strokes creates a movement ratio of about 30,000:10,000:1 (stepping motor:VCM:PZT actuator). In other embodiments, the ratios may be different based on the performance specifications of the motors and the actuators.

A first control signal 330 is sent from the stepping motor controller to the stepping motor 315. The head(s) are then moved in a coarse movement. In an embodiment, a head position sensor detects the position of the head(s) after the first movement and provides a positive error signal (PES) to the VCM and PZT controllers. In response, the VCM and the PZT controllers may further move the head(s) in a fine and a very fine movement, respectively, if needed, to place the head(s) into the desired position.

A first amplifier 333 may be positioned in between the PZT controller 307 and the PZT actuator 320 to amplify a second control signal 335. A second amplifier 338 may be positioned in between the VCM controller 310 and the VCM 325 to amplify a third control signal 340.

In an embodiment, the PZT actuator 320 and the VCM 325 move the head(s) serially. The VCM first moves the head(s) and then, if the head(s) are within a first threshold distance from the target position, the PZT actuator 320 may take over the movement of the head(s) for very fine movements. In another embodiment, the PZT actuator 320 and the VCM 325 may move the head(s) in parallel. It should be noted that although PZT is used throughout in the description of the control system of FIG. 3, as disclosed above, other types of actuators may be used in place of PZTs, and the system of FIG. 3 may be adapted accordingly in other embodiments.

Figure 4A:
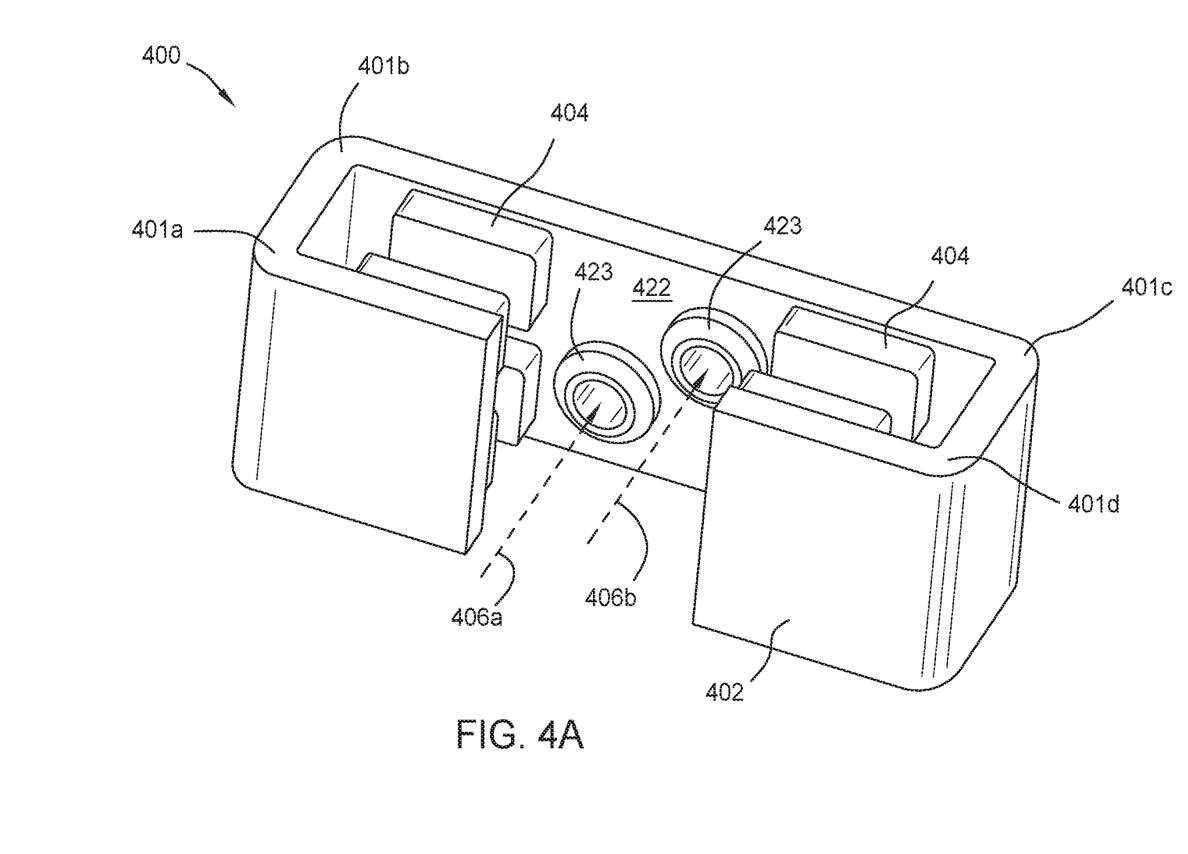
FIG. 4A is a schematic illustration of a VCM assembly according to one embodiment.

FIG. 4A illustrates a VCM yoke assembly 400 that includes a body 402 with a plurality of openings 406a, 406b. The VCM yoke assembly 400 further includes a plurality of spacer elements 423 coupled to the body 402. The VCM yoke assembly 400 further includes a plurality of magnets 404 coupled to the body 402. The body 402 of the VCM yoke assembly 400 is designed to be coupled to an actuator block of the VCM, such as the VCM 125 of FIG. 1, by a coupling mechanism, such as a screw, utilizing the openings 406a, 406b and the plurality of spacer elements 423.

The VCM yoke assembly 400 aids in the movement of a head assembly, such as the head assembly 130 of FIG. 1, when a current passes through a VCM coil of the VCM and interacts with the magnetic field of the plurality of magnets 404 coupled to the body 402. The plurality of magnets 404 may be coupled to the body 402 in a pattern, such as the pattern illustrated in FIG. 4A. The illustrated pattern is not intended to be limiting, but to provide an example of a potential embodiment.

The plurality of magnets 404 may include a material selected from the group that includes nickel (Ni), iron (Fe), cobalt (Co), and alloys thereof. Additionally, it is to be understood that while Ni, Fe, and Co have been exemplified as the plurality of magnets 404 materials, other ferromagnetic materials are contemplated and the embodiments herein are not limited to Ni, Fe, or Co for the plurality of magnets 404. The one or more magnets 404a, 404b, 404c, 404d may collectively be referred to as a plurality of magnets 404.

The body 402 may include a material selected from the group that includes nickel (Ni), iron (Fe), cobalt (Co), and alloys thereof. Additionally, it is to be understood that while Ni, Fe, and Co have been exemplified as the body 402 materials, other ferromagnetic materials are contemplated and the embodiments herein are not limited to Ni, Fe, or Co for the body 402.

The body 402 may be formed from a single strip of the materials previously mentioned. The single strip may be bent in a first location 401a, a second location 401b, a third location 401c, and a third location 401d. Each bend may be at an angle of about 90°, where each bend is in the same direction (i.e., turns in on itself), and the resulting single strip forms a body 402 in the shape of a "C". The "C" shaped structure has a double bend for each end of the body 402. Furthermore, the distance between the first location 401a and the second location 401b is equal to the distance between the third location 401c and the fourth location 401d, where a line connecting the first location 401a to the second location 401b is parallel to a line connecting the third location 401c and the fourth location 401d. The distance between the first location 401a and the fourth location 401d is equal to the distance between the second location 401b and the third location 401c, where a line connecting the first location 401a to the fourth location 401d is parallel to a line connecting the second location 401b and the third location 401c.

In one embodiment, the plurality of spacer elements 423 comprises butyl rubber or fluoro rubber. The listed materials of the plurality of spacer elements 423 is not intended to be limiting, but to provide an example of a possible embodiment. The plurality of spacer elements 423 may be any dampening material, such that vibrations during the movement of the VCM and the head assembly, such as the head assembly 130 of FIG. 1, is lessened. Furthermore, the plurality of spacer elements 423 includes a portion that fits within the openings 406a, 406b. The portion of the spacer elements 423 that fits within a corresponding opening 406a, 406b may form a seal with the inner surface of the openings 406a, 406b. Furthermore, the plurality of spacer elements 423 includes an opening through the center of the plurality of spacer elements 423. The opening through the center of the plurality of spacer elements 423 may be sized to allow for a connection unit, such as a screw, to fit within the opening and connect the body 402 to an actuator block of the VCM. Furthermore, the plurality of spacer elements 423 may be sized appropriately to decrease the vibrations during device operations.

Figure 4B:
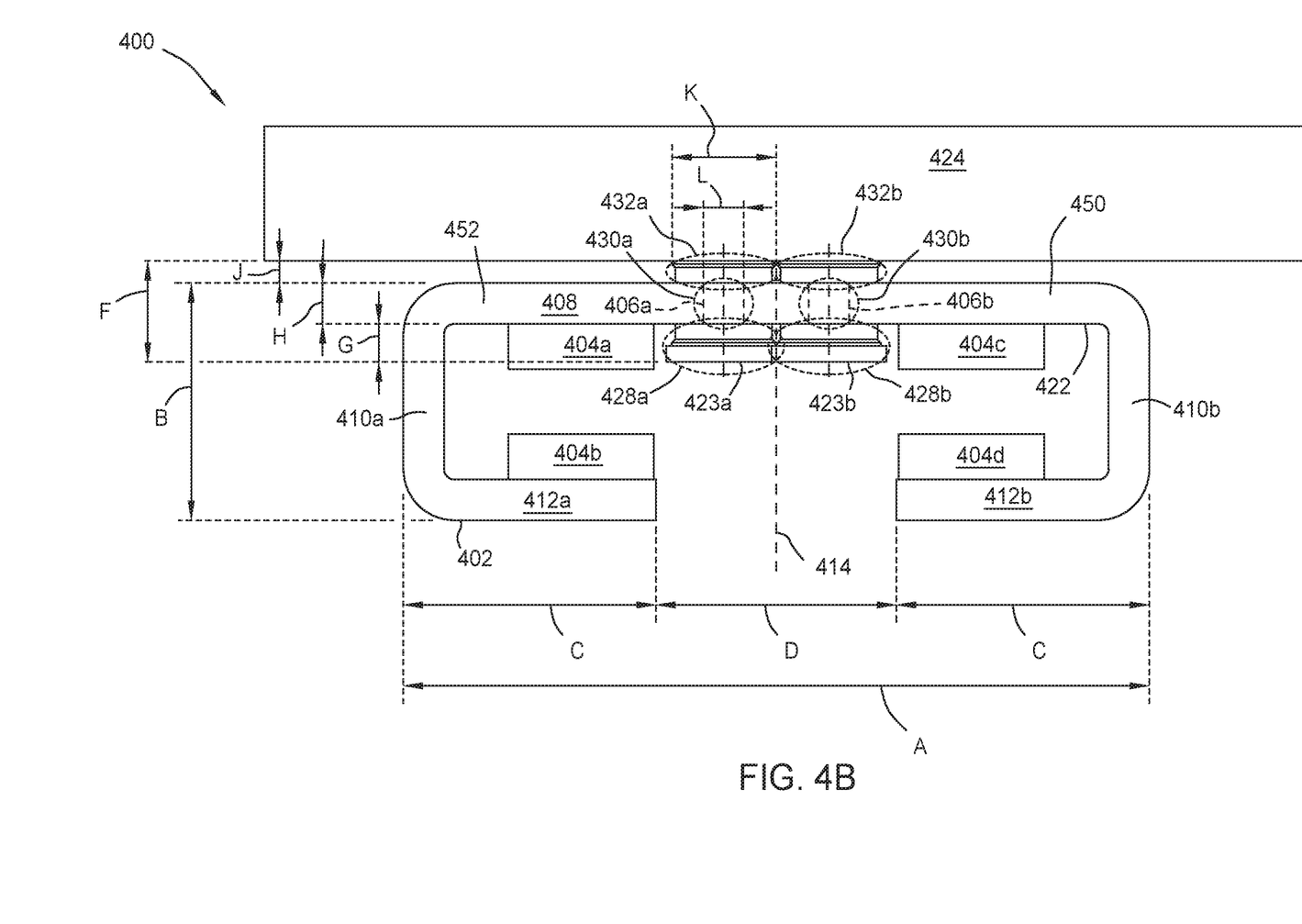
FIGS. 4B and 4C are schematic illustrations of the VCM assembly of FIG. 5A mounted to an actuator block.

FIG. 4B illustrates a top view of the VCM yoke assembly 400 that includes the body 402 and the plurality of spacer elements 423 mounted to an actuator block 424. The actuator block 424 may be the actuator block of the VCM 125 of FIG. 1. The body 402 includes a backbone portion 408, a first arm portion 410a coupled to the backbone portion 408, and a first hand portion 412a coupled to the first arm portion 410a. The body 402 further includes a second arm portion 410b coupled to the backbone portion 408 and a second hand portion 412b coupled to the second arm portion 410b. The backbone portion 408 includes a top surface 452, a bottom surface (not shown), a front surface 422 coupled between the top surface 452 and the bottom surface, and a back surface 450 coupled between the top surface 452 and the bottom surface. The front surface 422 and the back surface 450 are on opposite sides of each other and connected to the top surface 452 and the bottom surface. A hypothetical line 414 is located at the midpoint of the backbone portion 408 and is parallel to the first arm portion 410a and the second arm portion 410b.

The backbone portion 408 has a length "A" of between about 32 mm and about 33 mm. The first arm portion 410a and the second arm portion 410b each have a length "B" of between about 10 mm and about 11 mm and are substantially equal to each other. Furthermore, the first hand portion 412a and the second hand portion 412b each have a length "C" of between about 10 mm and about 12 mm and are substantially equal to each other. The first hand portion 412a is spaced away from the second hand portion 412b at a distance "D" of between about 10 mm and about 11 mm.

The openings 406a, 406b each has a diameter of between about 3 mm and about 4 mm and are equally spaced from the center of the backbone portion 408. The openings 406a, 406b allow for materials to extend from the front surface 422 of the backbone portion 408 of the body 402 (e.g., the inner section of the "C" structure) to the back surface 450 of the backbone portion 408 of the body 402 (e.g., the outer section of the "C" structure that is opposite of the relevant inner section of the "C" structure"). The openings 406a, 406b are located on both sides of the hypothetical line 414.

Figure 4C:
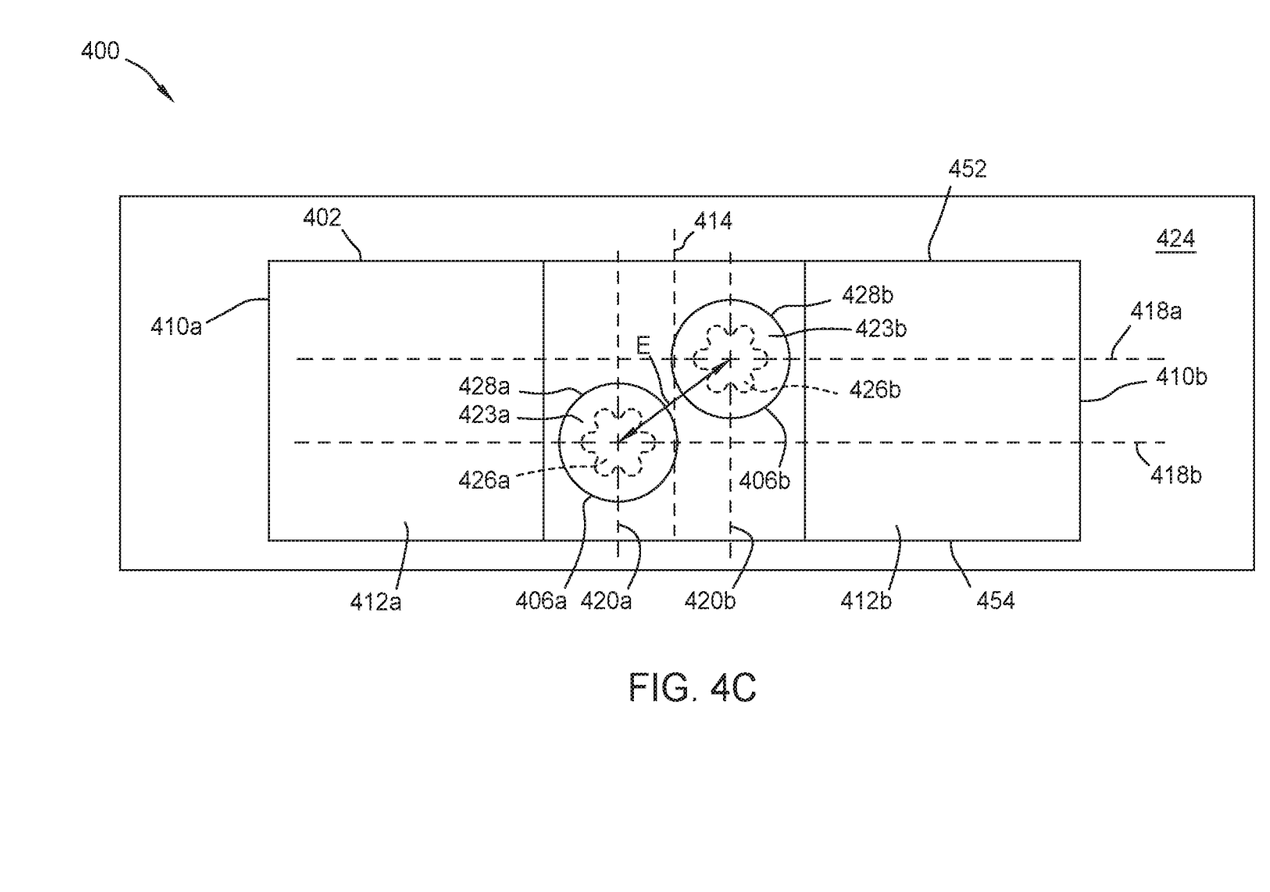

The spacer elements 423a, 423b may be referred to as a plurality of spacer elements 423 for exemplary purposes. Referring additionally to FIG. 4C, the center of the spacer element 423a may be spaced away from the center of the spacer element 423b at a distance "E" of between about 5 mm and 6 mm. When the connection unit 426a, 426b couples the body 402 to the actuator block 424, the corresponding spacer elements 423a, 423b are deformed to provide vibration dampening effects. The deforming compresses the spacer element between the fastener and the body 402 and also between the body 402 and the actuator block 424. The spacer elements 423a, 423b each have a total length "F", once deformed when the connection unit 426a, 426b couples the body 402 to the actuator block 424, of between about 4 mm and about 5 mm.

Furthermore, the spacer elements 423a, 423b each includes a first portion 428a, 428b extending to the front surface 422 of the backbone portion 408, a second portion 430a, 430b located within the openings 406a, 406b, and a third portion 432a, 432b extending from the back surface 450 of the backbone portion 408. The first portion 428a, 428b, has a first length "G", once deformed, of between about 0.75 mm and about 1.20 mm. The second portion 430a, 430b has a second length "H", where the second length is the same before and after the deformation of the one or more spacer elements 423a, 423b, of between about 1 mm and about 2 mm (e.g., the width of the body 402). The third portion 432a, 432b, has a third length "J", once deformed, of between about 0.75 mm and about 1.20 mm.

The first portion 428a, 428b of the spacer elements 423a, 423b has a first inner diameter and a first outer diameter. The first outer diameter has a length "K" between about 4 mm and about 5 mm. The second portion 430a, 430b of the one or more spacer elements 423a, 423b has a second inner diameter and a second outer diameter. The second outer diameter has a length "L" between about 3 mm and about 4 mm. The third portion 432a, 432b of the one or more spacer elements 423a, 423b has a third inner diameter and a third outer diameter. The third outer diameter has a length "K".

The first inner diameter, the second inner diameter, and the third inner diameter of the spacer elements 423a, 423b are substantially identical. The diameter dimensions of the first inner diameter, the second inner diameter, and the third inner diameter of the spacer elements 423a, 423b each is between about 2 mm and about 3 mm. Furthermore, the first outer diameter and the third outer diameter of the spacer elements 423a, 423b are substantially equal. The first outer diameter and the third outer diameter of the spacer elements 423a, 423b has a greater diameter than the second outer diameter. In one embodiment, the second outer diameter matches the diameter of the openings 406a, 406b.

FIG. 4C illustrates a view of the front surface 422 of the backbone portion 408, the first hand portion 412a, and the second hand portion 412b of the body 402 of a VCM assembly 400 that includes a first spacer element 423a and a second spacer element 423b. The first spacer element 423a and the second spacer element 423b are located in the positon of the first opening 406a and the second opening 406b, respectively, of FIG. 5A. It is to be understood that while the first opening 406a and the second opening 406b are shown to be offset with the first opening 406a closer to the bottom surface 454 as compared to the second opening 406b, the opening positions can be reversed such that the second opening 406b is closer to the bottom surface 454 as compared to the first opening 406a. Furthermore, it is contemplated that the openings 406a, 406b need not be offset, but rather, can be aligned along a plane that is substantially parallel to the bottom surface 454 or vertically aligned along a plan substantially perpendicular to the bottom surface 454. Additionally, it is to be understood that while two openings 406a, 406b are shown, a single opening, as well as more than two openings, is contemplated. Furthermore, while the two openings 406a, 406b are shown to be substantially identical, it is contemplated that the openings 406a, 406b can be different.

The VCM assembly 400 further includes a connection unit 426a, 426b for each of the openings 406a, 406b corresponding with the first portion 428a, 428b of the spacer elements 423a, 423b. The connection unit 426a, 426b couples the body 402 to the actuator block 424.

The first spacer element 423a is disposed on a first line 418b parallel to the top surface 452 and the bottom surface 454 of the backbone portion 408, where the first spacer element 423a is closer to the top surface 452 than the bottom surface 454. The second spacer element 423b is located on a second line 418a parallel to the top surface 452 and the bottom surface 454 of the backbone portion 408, where the second spacer element 423b is closer to the bottom surface 454 than the top surface 452.

The first spacer element 423a is located on a third line 420a parallel to a first arm portion 410a and a second arm portion 410b, where the first spacer element 423a is located between the theoretical line 414 and the first arm portion 410a. The first spacer element 423a is closer to the theoretical line 414 than the first arm portion 410a. The second spacer element 423b is located on a fourth line 420b parallel to a first arm portion 410a and a second arm portion 410b, where the second spacer element 423b is located between the theoretical line 414 and the second arm portion 410b. The second opening 406b is closer to the theoretical line 414 than the second arm portion 410b.

Figure 5A:
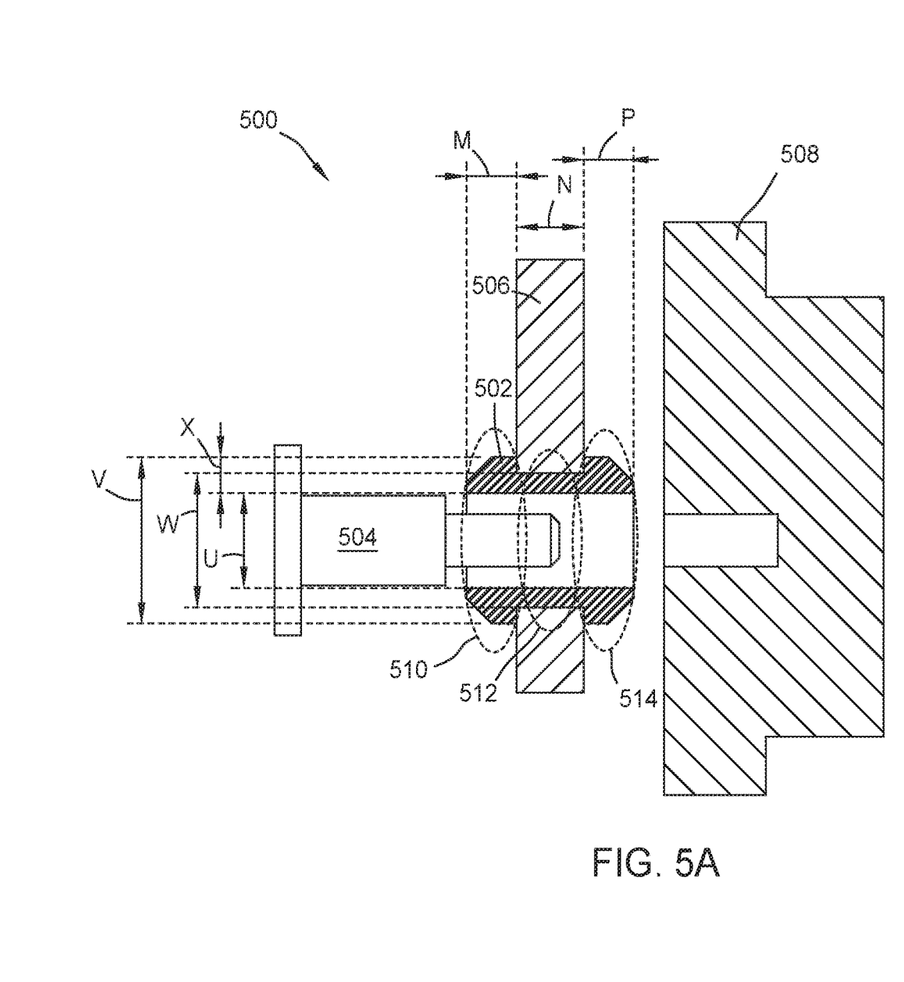
FIG. 5A is an exploded view of a VCM assembly, fastener, and actuator mount according to one embodiment.

FIG. 5A is an exploded view of a VCM assembly 500 including a fastener 504, VCM body 506, spacer element 502, and actuator mount 508 according to one embodiment. The spacer element 502 may include butyl rubber or fluoro rubber, and may be considered a soft mount.

The fastener 504 couples the VCM body 506 to the actuator mount 508 via a notch. The fastener 504 may be adequately sized to fit in the dimensions described in FIGS. 4A-4C and in the notch of the actuator mount 508, such that coupling the VCM body 506 to the actuator mount 508 may stabilized and support the VCM body 506 during device operation. Prior to coupling the VCM body 506 to the actuator mount 508, as illustrated in FIG. 5A, the spacer element 502 includes a first portion 510 with a length "M", a second portion 512 with a length "N", and a third portion 514 with a length "P".

Figure 5B:
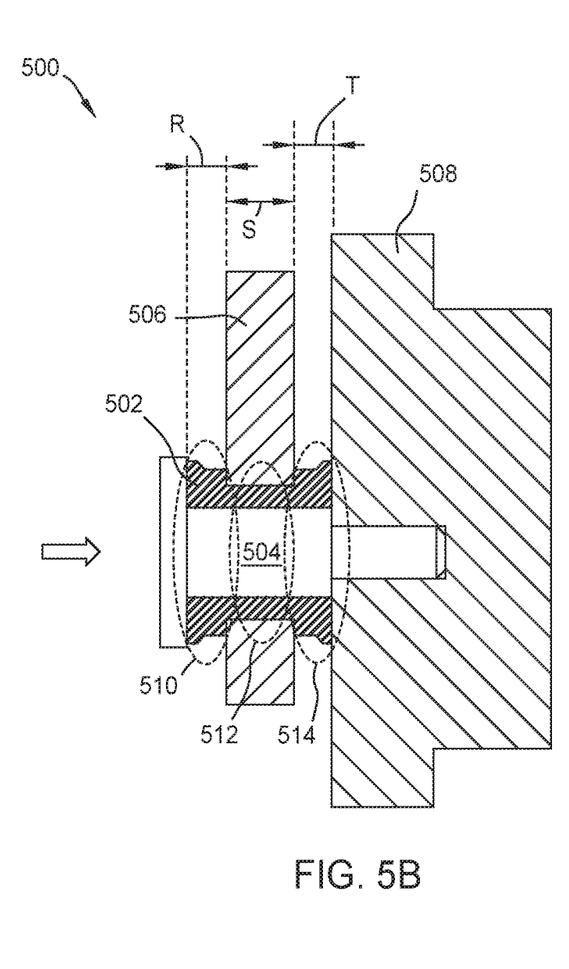
FIG. 5B is a schematic illustration of FIG. 5A assembled.

When coupling the VCM body 502 to the actuator mount 508, as illustrated in FIG. 5B, the spacer element 502 may deform due to the force applied by the fastener 504. Once assembled, the spacer element 502 first portion 510 has a length "R", the second portion 612 has a length "S", and the third portion 614 has a length "T". The length "M" and the length "P" are substantially identical and the length "R" and the length "T" are substantially identical and are between about 0.75 mm and about 1.20 mm. The length "N" and the length "S" are substantially identical and are between about 1 mm and about 2 mm (e.g., the width of the body 402). The length "S" is longer than the lengths "R", and "T". The length "N" is longer than the lengths "M" and "P". The length "R" and the length "T" are each between about 0.75 mm and about 1.20 mm.

The first portion 510 of the spacer elements 502 has a first inner diameter "U" and a first outer diameter "V". The second portion 512 of the spacer elements 502 has a second inner diameter "U" and a second outer diameter "W". The third portion 514 of the spacer elements 502 has a third inner diameter "U" and a third outer diameter "V".

The first inner diameter "U", the second inner diameter "U", and the third inner diameter "U" of the spacer elements 502 are substantially identical. The diameter dimensions of the first inner diameter "U", the second inner diameter "U", and the third inner diameter "U" of the spacer elements 502 each are between about 2 mm and about 3 mm. Furthermore, the first outer diameter "V" and the third outer diameter "V" of the spacer elements 502 are substantially equal. The first outer diameter "V" and the third outer diameter "V" of the spacer elements 502 has a greater diameter than the second outer diameter "W". The second outer diameter "W" is between about 3 mm and about 4 mm. In one embodiment, the second outer diameter "W" matches the diameter of the one or more openings of the VCM body 506, such as the openings 406a, 406b of FIGS. 4A-4C. The first outer diameter "V" and the third outer diameter "V" are between about 4 mm and about 5 mm. The listed dimensions are not intended to be limiting, but to provide an example of a possible embodiment. Once assembled, the second outer diameter "W" remains the same as does the first, second, and third inner diameters "U". The first and third outer diameters "V" increase due to the deformation of the spacer elements 502.

Figure 6:
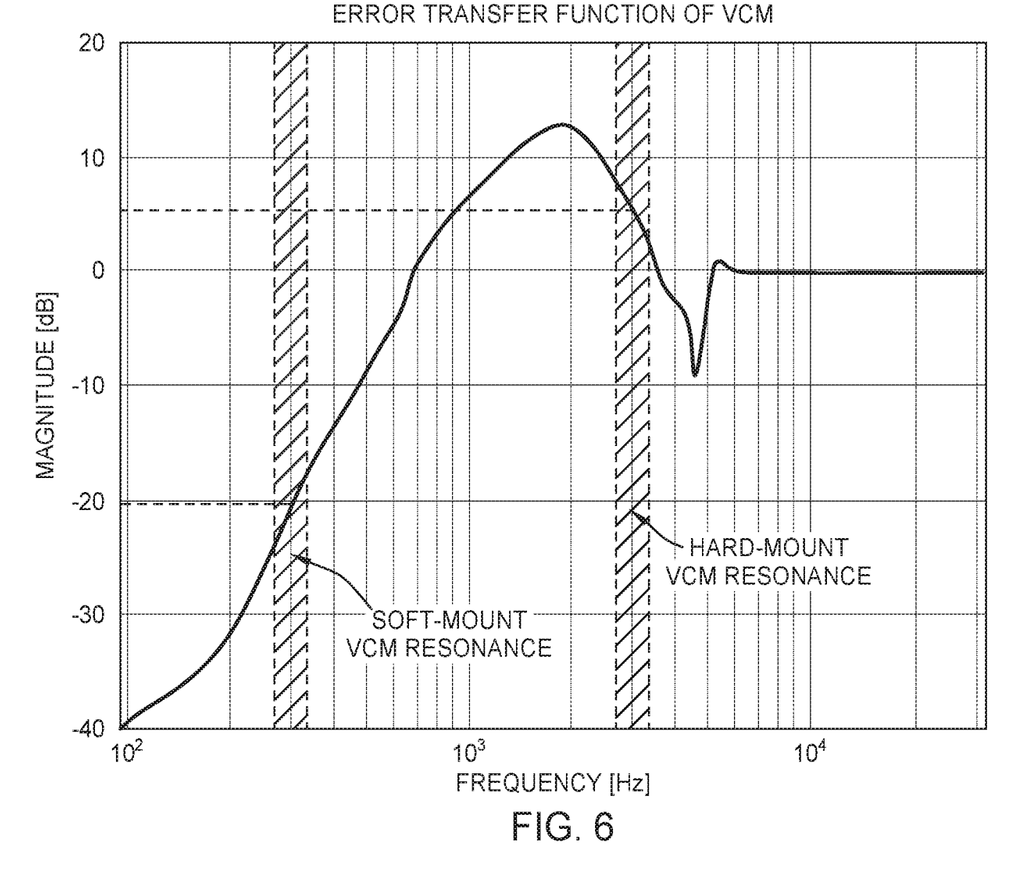
FIG. 6 is a graph illustrating the resonance frequency of a VCM assembly mounted to an actuator mount relative to the magnitude of movement for a soft mount VCM assembly and a hard mount VCM assembly.

FIG. 6 is a graph illustrating the resonance frequency of a VCM assembly mounted to an actuator mount relative to the magnitude of movement for a soft mount VCM assembly and a hard mount VCM assembly. Magnitude (dB) is graphed on the y-axis and the resonance frequency (Hz) is graphed on the x-axis. The soft mount VCM assembly utilizes the spacer element(s) described previously, whereas the hard mount VCM assembly does not utilize the spacer element(s).

The soft mount VCM resonance frequency may be reduced from that of the hard mount VCM resonance frequency from about 3000 Hz to about 300 Hz. Furthermore, the position error is reduced from about 5 dB to about −20 dB, or about 5% of the hard mount VCM position error, when utilizing the soft mount VCM rather than the hard mount VCM.

The decrease of the VCM resonance frequency when utilizing a soft mount, such as the spacer element(s), may be attributed to the parallel hardness and the rotational hardness of the spacer element(s). The spacer element(s) may include butyl rubber or fluoro rubber.

The rotational hardness of a spacer element may be defined by the equation, $Fr=(1/(2\pi))*SQRT((2Kr2)/J_{VCM})$, where Fr is the rotational hardness, K is spring constant, r is the internal radius (equivalent to "U") of a spacer element, $J_{VCM}$ is inertia of the VCM assembly, and SQRT is the square root of the elements within the parentheses. A spacer element has a rotational hardness of between about 46.7 Hz and about 93.3 Hz. Furthermore, the $J_{VCM}$ is between about 1800 gmm$^2$ to about 2000 gmm$^2$. The r (radius) may be between about 2 mm and about 3 mm. Furthermore, the K is between about 10264 N/m and about 41058 N/m and is determined by the material of the spacer element as different materials have different spring constants.

The parallel hardness of a spacer element may be defined by the equation, $Fp=(1/(2\pi))*SQRT((2K)/M_{VCM})$, where Fp is the parallel hardness, K is spring constant, $M_{VCM}$ is mass of the VCM assembly, and SQRT is the square root of the elements within the parentheses. A spacer element has a parallel hardness of between about 200 Hz and about 400 Hz. Furthermore, the $M_{VCM}$ is between about 12 g and about 15 g and the K is between about 10264 N/m and about 41058 N/m and is determined by the material of the spacer element as different materials have different spring constants.

The parallel hardness and the rotational hardness of a spacer element may reduce the reaction force by the linear motion of the VCM assembly, such as the VCM assembly 500 of FIGS. 5A-5B and the head assembly, such as the head assembly 130 of FIG. 1. During operation, the position control setting of the head bar of the head assembly may be improved by utilizing the spacer element to decrease the vibrational responses during device operation.

By using a soft mount device for mounting the VCM assembly to an actuator, a VCM yoke can be fabricated for data storage devices that can accommodate changing data storage device internal component space allocation while also reducing undesired movement of the magnetic recording head assembly.

In one embodiment, a voice coil motor (VCM) yoke assembly comprises: a VCM body having one or more openings formed therethrough; a spacer element extending through at least one opening of the one or more openings, wherein the spacer element comprises a first portion extending from a first side of the VCM body, a second portion extending through the at least one opening of the one or more openings, and a third portion extending from a second side of the VCM body, wherein the second side of the VCM body is opposite the first side of the VCM body, wherein the first portion has a first inner diameter and a first outer diameter, the second portion has a second inner diameter and a second outer diameter, and the third portion has a third inner diameter and a third outer diameter, wherein the first inner diameter and the second inner diameter are substantially identical, and wherein the first outer diameter and the second outer diameter are different; and a plurality of magnets coupled to the VCM body. The first inner diameter and the third inner diameter are substantially identical. The spacer element is a first spacer element, wherein the yoke assembly further comprises a second spacer element, wherein the first spacer element and the second spacer element are equidistant from a centerline of the VCM body. The first spacer element and the second spacer element are offset from one another such that the first spacer element is closer to a bottom surface of the VCM body compared to the second spacer element. The spacer element comprises butyl rubber or fluoro rubber. The first outer diameter and the third outer diameter are substantially identical. A data storage device comprises: the yoke assembly; an actuator mount; and a fastener coupling the yoke assembly to the actuator mount through the one or more openings, wherein installation of the fastener deforms the spacer element. The VCM body has a "C" shape when viewed from a top surface. A plurality of magnets are coupled to the VCM body. The VCM body comprises a backbone portion, a first arm portion coupled to the backbone portion, a first hand portion coupled to the first arm portion, a second arm portion coupled to the backbone portion, and a second hand portion coupled to the second arm portion, wherein the backbone portion has one or more openings formed therethrough, wherein the first arm portion extends substantially perpendicular from the backbone portion, wherein the first hand portion extends substantially perpendicular from the first arm portion, wherein the second arm portion is substantially parallel to the first arm portion, and wherein the second hand portion is substantially parallel to the first hand portion. The VCM body comprises a material selected from the group consisting of nickel, iron, cobalt, and alloys thereof.

In another embodiment, a voice coil motor (VCM) yoke assembly comprises: a VCM body having one or more openings formed therethrough; a spacer element extending through at least one opening of the one or more openings, wherein the spacer element has a rotational hardness defined by: $Fr=(1/(2\pi))*SQRT((2Kr^2)/J_{VCM})$ where Fr is the rotational hardness, K is spring constant of the spacer element, r is an internal radius the spacer element, $J_{VCM}$ is inertia of the VCM assembly, and SQRT is square root, wherein the rotational hardness is between about 46.7 Hz and about 93.3 Hz; and a plurality of magnets coupled to the VCM body. $J_{VCM}$ is between about 1800 gmm$^2$ to about 2000 gmm$^2$. A plurality of magnets are coupled to the VCM body. A data storage device comprising the yoke assembly is also contemplated.

In another embodiment, a voice coil motor (VCM) yoke assembly comprises: a VCM body having one or more openings formed therethrough; a spacer element extending through at least one opening of the one or more openings, wherein the spacer element has a parallel hardness defined by: $Fp=(1/(2\pi))*SQRT((2K)/M_{VCM})$ where Fp is the parallel hardness, K is spring constant of the spacer element, $M_{VCM}$ is mass of the VCM assembly, SQRT is square root, wherein the parallel hardness is between about 200 Hz and about 400 Hz; and a plurality of magnets coupled to the VCM body. $M_{VCM}$ is between about 12 g and about 15 g. K is between about 10264 N/m and about 41058 N/m. The VCM body comprises four bends, wherein the four bends are all in a same direction, wherein ends of the VCM body are aligned in a common plane when viewed from a top view, and wherein the ends of the VCM body are spaced apart. A data storage device comprising the yoke assembly is also contemplated.

While the foregoing is directed to embodiments of the present disclosure, other and further embodiments of the disclosure may be devised without departing from the basic scope thereof, and the scope thereof is determined by the claims that follow.

What is claimed is:
1. A voice coil motor (VCM) yoke assembly, comprising:
a VCM body, wherein the VCM body comprises:
a backbone portion, wherein the backbone portion comprises a first side, a second side, and one or more openings formed therethrough;
a first arm portion couple to the backbone portion;

a first hand portion coupled to the first arm portion, wherein the first hand portion is opposite the first side of the backbone portion;
a spacer element extending through at least one opening of the one or more openings, wherein the spacer element comprises:
a first portion extending from the first side of the VCM body,
a second portion extending through the at least one opening of the one or more openings, and
a third portion extending from the second side of the VCM body, wherein the second side of the VCM body is opposite the first side of the VCM body,
wherein the first portion has a first inner diameter and a first outer diameter, the second portion has a second inner diameter and a second outer diameter, and the third portion has a third inner diameter and a third outer diameter,
wherein the first inner diameter and the second inner diameter are substantially identical, and wherein the first outer diameter and the second outer diameter are different; and
a plurality of magnets coupled to the VCM body.

2. The yoke assembly of claim 1, wherein the first inner diameter and the third inner diameter are substantially identical.

3. The yoke assembly of claim 1, wherein the spacer element is a first spacer element, wherein the yoke assembly further comprises a second spacer element, wherein the first spacer element and the second spacer element are equidistant from a centerline of the VCM body.

4. The yoke assembly of claim 3, wherein the first spacer element and the second spacer element are offset from one another such that the first spacer element is closer to a bottom surface of the VCM body compared to the second spacer element.

5. The yoke assembly of claim 1, wherein the spacer element comprises butyl rubber or fluoro rubber.

6. The yoke assembly of claim 1, wherein the first outer diameter and the third outer diameter are substantially identical.

7. A data storage device, comprising:
a voice coil motor (VCM) yoke assembly, comprising:
a VCM body having one or more openings formed therethrough;
a spacer element extending through at least one opening of the one or more openings, wherein the spacer element comprises:
a first portion extending from a first side of the VCM body,
a second portion extending through the at least one opening of the one or more openings, and
a third portion extending from a second side of the VCM body, wherein the second side of the VCM body is opposite the first side of the VCM body,
wherein the first portion has a first inner diameter and a first outer diameter, the second portion has a second inner diameter and a second outer diameter, and the third portion has a third inner diameter and a third outer diameter,
wherein the first inner diameter and the second inner diameter are substantially identical, and wherein the first outer diameter and the second outer diameter are different; and
a plurality of magnets coupled to the VCM body;
an actuator mount; and
a fastener coupling the yoke assembly to the actuator mount through the one or more openings, wherein installation of the fastener deforms the spacer element.

8. The data storage device of claim 7, wherein the VCM body has a "C" shape when viewed from a top surface.

9. The data storage device of claim 7, wherein the VCM body comprises a backbone portion, a first arm portion coupled to the backbone portion, a first hand portion coupled to the first arm portion, a second arm portion coupled to the backbone portion, and a second hand portion coupled to the second arm portion, wherein the backbone portion has one or more openings formed therethrough, wherein the first arm portion extends substantially perpendicular from the backbone portion, wherein the first hand portion extends substantially perpendicular from the first arm portion, wherein the second arm portion is substantially parallel to the first arm portion, and wherein the second hand portion is substantially parallel to the first hand portion.

10. The data storage device of claim 7, wherein the VCM body comprises a material selected from the group consisting of nickel, iron, cobalt, and alloys thereof.

11. A voice coil motor (VCM) yoke assembly, comprising:
a VCM body having one or more openings formed therethrough;
a spacer element extending through at least one opening of the one or more openings, wherein the spacer element has a rotational hardness defined by:

$$Fr=(1/(2\pi))*SQRT((2Kr^2)/J_{VCM})$$

where Fr is the rotational hardness, K is spring constant of the spacer element, r is an internal radius of the spacer element, $J_{VCM}$ is inertia of the VCM yoke assembly, and SQRT is square root, wherein the rotational hardness is between about 46.7 Hz and about 93.3 Hz; and
a plurality of magnets coupled to the VCM body.

12. The yoke assembly of claim 11, wherein $J_{VCM}$ is between about 1800 gmm$^2$ to about 2000 gmm$^2$.

13. The yoke assembly of claim 11, further comprising a plurality of magnets coupled to the VCM body.

14. A data storage device comprising the yoke assembly of claim 11.

15. A voice coil motor (VCM) yoke assembly, comprising:
a VCM body having one or more openings formed therethrough;
a spacer element extending through at least one opening of the one or more openings, wherein the spacer element has a parallel hardness defined by:

$$Fr=(1/(2\pi))*SQRT((2K)/M_{VCM})$$

where Fp is the parallel hardness, K is spring constant of the spacer element, $M_{VCM}$ is mass of the VCM yoke assembly, and SQRT is square root, wherein the parallel hardness is between about 200 Hz and about 400 Hz; and
a plurality of magnets coupled to the VCM body.

16. The yoke assembly of claim 15, wherein $M_{VCM}$ is between about 12 g and about 15 g.

17. The yoke assembly of claim 15, wherein K is between about 10264 N/m and about 41058 N/m.

18. The yoke assembly of claim 15, wherein the VCM body comprises four bends, wherein the four bends are all in a same direction, wherein ends of the VCM body are aligned in a common plane when viewed from a top view, and wherein the ends of the VCM body are spaced apart.

19. A data storage device comprising the yoke assembly of claim 15.

\* \* \* \* \*